(12) United States Patent
Carrie et al.

(10) Patent No.: US 10,578,744 B2
(45) Date of Patent: Mar. 3, 2020

(54) METHOD FOR CALIBRATING A SATELLITE RADIO NAVIGATION RECEIVER

(71) Applicant: THALES, Courbevoie (FR)

(72) Inventors: Guillaume Carrie, Toulouse (FR);
Benoît Vautherin, Toulouse (FR);
Damien Serant, Toulouse (FR)

(73) Assignee: THALES, Courbevoie (FR)

( * ) Notice: Subject to any disclaimer, the term of this patent is extended or adjusted under 35 U.S.C. 154(b) by 385 days.

(21) Appl. No.: 15/414,435

(22) Filed: Jan. 24, 2017

(65) Prior Publication Data
US 2017/0227653 A1   Aug. 10, 2017

(30) Foreign Application Priority Data

Feb. 5, 2016 (FR) .................................. 16 00197

(51) Int. Cl.
| G01S 19/23 | (2010.01) |
| G01S 19/14 | (2010.01) |
| G01S 19/28 | (2010.01) |

(52) U.S. Cl.
CPC ............ *G01S 19/235* (2013.01); *G01S 19/23* (2013.01); *G01S 19/14* (2013.01); *G01S 19/28* (2013.01)

(58) Field of Classification Search
CPC ........ G01S 19/235; G01S 19/14; G01S 19/23; G01S 19/28
USPC ........................... 342/357.62, 357.67, 357.52
See application file for complete search history.

(56) References Cited

U.S. PATENT DOCUMENTS

| 5,525,997 A | | 6/1996 | Kwon | |
| 5,579,014 A | * | 11/1996 | Brooksby | G01S 19/09 342/357.69 |
| 5,949,372 A | * | 9/1999 | Lennen | G01S 19/23 342/357.62 |
| 5,966,411 A | * | 10/1999 | Struhsaker | H04B 1/712 370/206 |
| 6,069,912 A | * | 5/2000 | Sawahashi | H04B 1/707 375/142 |

(Continued)

FOREIGN PATENT DOCUMENTS

| EP | 0 805 510 A2 | 11/1997 |
| WO | 2012/025306 A1 | 3/2012 |

OTHER PUBLICATIONS

Achim Dreher et al., "Compact Adaptive Multi-antenna Navigation Receiver," GNSS 2012 Proceedings of the 25th International Technical Meeting of the Satellite Division of the Institute of Navigation, Sep. 21, 2012, pp. 917-925, XP056008409.

(Continued)

*Primary Examiner* — Chuong P Nguyen
(74) *Attorney, Agent, or Firm* — Baker & Hostetler LLP (57) ABSTRACT

A method for calibrating a multichannel GNSS receiver which does not require the use of a specific signal generator and which may be implemented directly on the basis of simple measurements taken from a receiver in operation comprises determining a first, broadband equalization filter which may be positioned at the output of the RF reception channels and at the input of the correlators in order to correct the mismatch between the various RF reception channels. The invention also consists of determining a second, narrowband equalization filter in order to correct residual phase and gain errors.

17 Claims, 3 Drawing Sheets

(56) References Cited

U.S. PATENT DOCUMENTS

| | | | |
|---|---|---|---|
| 7,053,827 B2* | 5/2006 | Awata | G01S 19/29 |
| | | | 342/357.68 |
| 7,304,605 B2 | 12/2007 | Wells | |
| 8,634,505 B2* | 1/2014 | Kim | H04B 7/04 |
| | | | 375/340 |
| 10,243,593 B2* | 3/2019 | Pipon | H04B 1/1081 |
| 2004/0234016 A1 | 11/2004 | Leblond et al. | |
| 2006/0193392 A1* | 8/2006 | Kim | H04L 27/2659 |
| | | | 375/260 |
| 2010/0283673 A1* | 11/2010 | Farrokhi | G01S 19/22 |
| | | | 342/357.25 |
| 2018/0159640 A1* | 6/2018 | Taher | H04B 17/21 |
| 2018/0191382 A1* | 7/2018 | Pipon | H04B 1/1081 |
| 2019/0033423 A1* | 1/2019 | Moshfeghi | H04W 64/006 |

OTHER PUBLICATIONS

Mark Petovello, "GNSS Solutions: Carrier-to-Noise Algorithms," Inside GNSS, Jan./Feb. 2010, pp. 20-27.

* cited by examiner

METHOD FOR CALIBRATING A SATELLITE RADIO NAVIGATION RECEIVER

CROSS-REFERENCE TO RELATED APPLICATION

This application claims priority to foreign French patent application No. FR 1600197, filed on Feb. 5, 2016, the disclosure of which is incorporated by reference in its entirety.

FIELD OF THE INVENTION

The invention relates to the field of satellite radio navigation receivers, also referred to as GNSS (global navigation satellite system) receivers, and, more specifically, to multi-antenna receivers comprising multiple reception channels. The invention also relates to the field of spread-spectrum signal processing, which encompasses satellite radio navigation signals.

The subject of the invention is a method for calibrating a multichannel GNSS receiver leading to the determination of a broadband equalization filter and/or a narrowband equalization filter, and a receiver comprising such filters.

BACKGROUND

In a multichannel receiver, a general problem relates to the calibration of the various reception channels in order to compensate for differences in time, phase and amplitude which may affect the signal received over the various channels. Specifically, each reception channel comprises an antenna and a radiofrequency reception chain which comprises, in particular, one or more shaping filters and one or more amplifiers. These various components might not have exactly the same characteristics; in particular, the group delays, the amplitude gain and the phase response may be substantially different. These differences lead to a mismatch of the reception channels, which should, in theory, all have the same frequency response (transfer function). The signals received over the various reception channels may thus be affected by these differences and the processing operations applied to the signals for the purpose of determining information on the positioning of the receiver or on the direction of arrival of the signals may be disrupted.

Within a context of applications that require highly reliable positioning information, it is therefore necessary to calibrate the receivers very precisely in order to minimize distortions between the various reception channels. This requirement is especially important for aeronautical applications or those linked to transport.

The known solutions for solving the problem of calibrating a multichannel GNSS receiver may be based on a factory pre-calibration carried out on each device and using measurements taken in a laboratory or in an anechoic chamber. As the response of RF reception channels is temperature-sensitive, it is necessary to use thermostatically controlled components or thermal sensors. Other solutions use a dedicated calibration radiofrequency signal which is generated by a specific device inside or outside the receiver.

In general, the existing solutions have the drawback of requiring additional equipment or devices.

Other solutions, described in the documents EP805510, U.S. Pat. Nos. 5,525,997 and 7,304,605, are also known.

The invention proposes a method for calibrating a multichannel GNSS receiver which does not require the use of a specific signal generator and which may be implemented directly on the basis of simple measurements taken from a receiver in operation.

The invention consists in particular of determining a first, broadband equalization filter which may be positioned at the output of the RF reception channels and at the input of the correlators in order to correct the mismatch between the various RF reception channels. The invention also consists of determining a second, narrowband equalization filter in order to correct residual phase and gain errors.

The invention is applicable to any satellite positioning system, in particular to compatible receivers of the GNSS GPS, GALILEO or GLONASS systems.

SUMMARY OF THE INVENTION

One subject of the invention is thus a method for calibrating a satellite navigation signal receiver, said receiver comprising a plurality of reception channels each comprising a receiving antenna and a plurality of correlators for correlating the signal received by the antenna with a local code delayed by a parametrizable delay, said calibration method comprising the determination of at least one broadband equalization filter intended to be applied between the receiving antenna and the correlators of each reception channel, said broadband equalization filters being obtained by means of the following steps:
- constructing, for each reception channel, a correlation vector comprising the correlation points obtained simultaneously as output from said correlators;
- determining, on the basis of the correlation function of the local code with the received signal, which function is estimated, for each reception channel, on the basis of the correlation vectors, the reception channel, called the reference channel, for which the received signal has the longest delay with respect to the local code;
- determining, for each reception channel other than the reference channel, the broadband equalization filter by calculating the deconvolution of the correlation vector of said reception channel by the correlation vector of the reference channel.

According to one variant embodiment, the method according to the invention comprises, beforehand, the search for and retention of those signals, from among the signals received by said receiver and arising from multiple satellites, that are not affected by the presence of multipaths of the signal, and the selection of a signal from among those retained.

According to one variant embodiment, the method according to the invention comprises the search for and selection of the signal, from among the retained signals, that is transmitted by the satellite having the highest elevation from among the satellites transmitting the signals received by said receiver.

According to one variant embodiment, the method according to the invention comprises the search for and selection of the signal, from among the retained signals, that has the highest signal-to-noise ratio.

According to one variant embodiment, the method according to the invention comprises a step of filtering the outputs of said correlators in order to decrease the measurement noise.

According to one variant embodiment, the method according to the invention comprises the determination of a narrowband equalization filter comprising a complex coefficient intended to be applied to the signal filtered by the broadband equalization filter on each reception channel, said narrowband equalization filter being obtained via the following steps:

filtering, for each received signal arising from a separate satellite and for each reception channel, the correlation vector using the broadband equalization filter;

determining, for each received signal arising from a separate satellite, a spatial intercorrelation matrix $R_k$ on the basis of the correlation vectors of each reception channel;

determining, for each received signal arising from a separate satellite, the theoretical direction of arrival of the received signal on the basis of the position of the satellite;

determining a cost function Q representative of the overall error between the estimated directions of arrival and the theoretical directions of arrival of the received signals, an estimated direction of arrival being determined on the basis of the spatial intercorrelation matrix $R_k$ and of the complex coefficient of the narrowband equalization filter applied to the received signal;

searching for, for each reception channel, the values of the complex coefficients that allow the cost function Q to be minimized.

Another subject of the invention is a method for calibrating a satellite navigation signal receiver, said receiver comprising a plurality of reception channels each comprising a receiving antenna, a plurality of correlators for correlating the signal received by the antenna with a local code delayed by a parametrizable delay and a broadband equalization filter, obtained by virtue of the execution of the calibration method according to the invention and applied between the receiving antenna and the correlators of each reception channel, said calibration method comprising the determination of a narrowband equalization filter comprising a complex coefficient intended to be applied to the signal filtered by the broadband equalization filter on each reception channel, said narrowband equalization filter being obtained by means of the following steps:

determining, for each received signal arising from a separate satellite, a spatial intercorrelation matrix $R_k$ on the basis of the correlation vectors of each reception channel;

determining, for each received signal arising from a separate satellite, the theoretical direction of arrival of the received signal on the basis of the position of the satellite;

determining a cost function Q representative of the overall error between the estimated directions of arrival and the theoretical directions of arrival of the received signals, an estimated direction of arrival being determined on the basis of the spatial intercorrelation matrix $R_k$ and of the complex coefficient of the narrowband equalization filter applied to the received signal;

searching for, for each reception channel, the values of the complex coefficients that allow the cost function Q to be minimized.

According to one particular aspect of the invention, the spatial intercorrelation matrix $R_k$ is averaged over multiple consecutive instants in time.

According to one particular aspect of the invention, the directions of arrival of the received signals are transposed to a reference frame linked to the receiving antennas on the basis of the attitude of the receiver.

According to one particular aspect of the invention, the attitude of the receiver is integrated as a parameter of the cost function Q and the method additionally comprises the search for the value of the attitude of the receiver that allows the cost function Q to be minimized.

According to one particular aspect of the invention, the cost function Q depends on the steering vectors $a(\hat{\theta}_k, \hat{\varphi}_k)$ of the receiving antennas of the receiver which are calculated along the theoretical directions of arrival of the received signals.

According to one particular aspect of the invention, the cost function Q is obtained by summing multiple cost functions, each representative of the error between the estimated direction of arrival and the theoretical direction of arrival of a received signal arising from a satellite.

According to one particular aspect of the invention, the cost function Q is given by the relationship $$Q = \sum_{k=1}^{N_s} a(\hat{\theta}_k, \hat{\varphi}_k)^H \Gamma^H R_k^{-1} \Gamma \cdot a(\hat{\theta}_k, \hat{\varphi}_k),$$

where $N_s$ is the number of received signals arising from separate satellites, $R_k^{-1}$ is the inverse of the spatial intercorrelation matrix, $\Gamma$ is a diagonal matrix, the components of which are the complex coefficients of the narrowband equalization filters on each reception channel, and $^H$ is the conjugate transpose operator.

Another subject of the invention is a satellite navigation signal receiver comprising a plurality of reception channels each comprising a receiving antenna, a plurality of correlators for correlating the signal received by the antenna with a local code delayed by a parametrizable delay and a broadband equalization filter positioned between the receiving antenna and said correlators and obtained by virtue of the execution of the calibration method according to a first embodiment of the invention.

In one particular variant embodiment, the receiver according to the invention additionally comprises, on each reception channel, a narrowband equalization filter with a complex coefficient, positioned between the output of the broadband equalization filter and the input of said correlators and obtained by virtue of the execution of the calibration method according to a second embodiment of the invention.

In one particular variant embodiment, the receiver according to the invention additionally comprises, on each reception channel, at least one delay line connected to the output of said correlators.

An additional subject of the invention is a computer program comprising instructions for executing the method for calibrating a satellite navigation signal receiver according to the invention when the program is executed by a processor.

BRIEF DESCRIPTION OF THE DRAWINGS

Other features and advantages of the present invention will become more apparent upon reading the description which follows in relation to the appended drawings, which represent.

DETAILED DESCRIPTION

Figure 1:
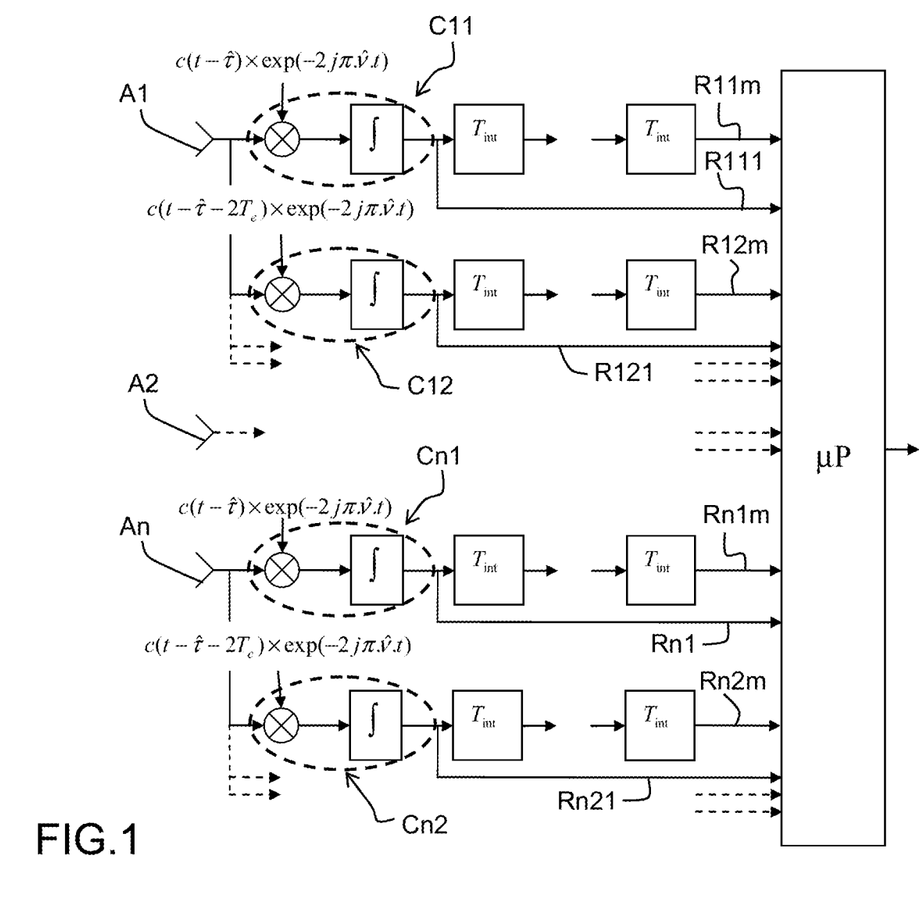
FIG. 1, a diagram of a multichannel GNSS receiver.

FIG. 1 shows a diagram of an exemplary multichannel GNSS receiver to which the invention is applicable. Such a receiver is described in detail in the international patent application published under the number WO 2012/025306.

It comprises multiple reception channels each comprising an elementary antenna A1, A2 . . . An, designed to receive one or more radio navigation signals transmitted by one or more satellites. Each reception channel also comprises a radiofrequency processing chain (not shown in FIG. 1) comprising, in particular, one or more shaping filters, one or more amplifiers and an analogue-to-digital converter. The sampled analogue signals are then delivered to multiple correlators C11, C12 . . . Cn1, Cn2. The purpose of a correlator is to correlate the received signal with a local version of the spreading code used to transmit the radio navigation signal. It is recalled that radio navigation signals are spread spectrum signals, for example signals using the CDMA (code division multiple access) spread spectrum technique in the case of the GPS and Galileo systems. A specific code is associated with each satellite of the constellation.

Multiple correlators C11, C12 are used to form a bank of correlators on each reception channel. Each correlator of the bank uses a delayed version of the local code, the delay being a multiple of the sampling period of the signal.

A correlator delivers correlation points as output and the various correlation points delivered by the bank of correlators allow a correlation function to be formed. Searching for the peak (or maximum) of this correlation function allows the received signal to be synchronized to the local code and thus positioning information to be determined by means of multiple measurements of pseudo-distances between multiple satellites and the receiver.

Each correlator may also be connected to the output of one or more delay lines R11$m$, R111, R12$m$, R121 . . . Rn1$m$, Rn11, Rn2$m$. The gap introduced by each delay line corresponds to a multiple of the integration duration of a correlator. The delay lines allow the correlation results to be saved for a duration equal to the number of delay lines multiplied by the integration duration.

The various correlation results are then delivered to a calculation module µP which implements a signal processing algorithm allowing positioning information to be determined.

An objective of the invention is to propose a method for calibrating a multichannel receiver of the same type as that described in FIG. 1.

Figure 2:
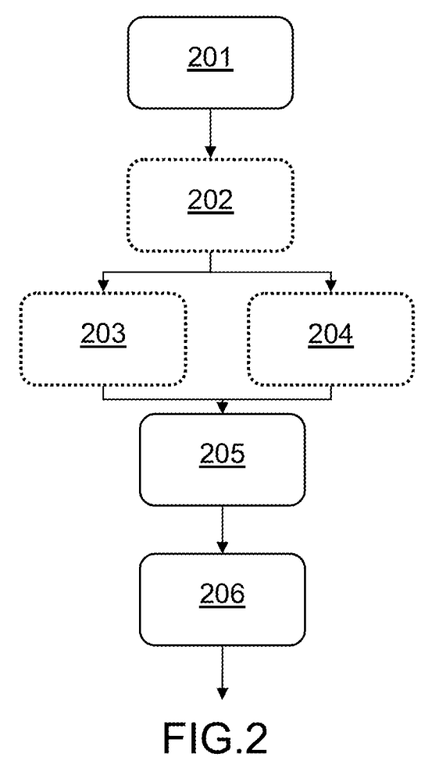
FIG. 2, a flowchart describing the steps for implementing a calibration method according to a first embodiment of the invention.

FIG. 2 shows a flowchart detailing the steps for implementing the calibration method according to a first embodiment of the invention which comprises the determination of a broadband equalization filter for each reception channel.

Figure 4:
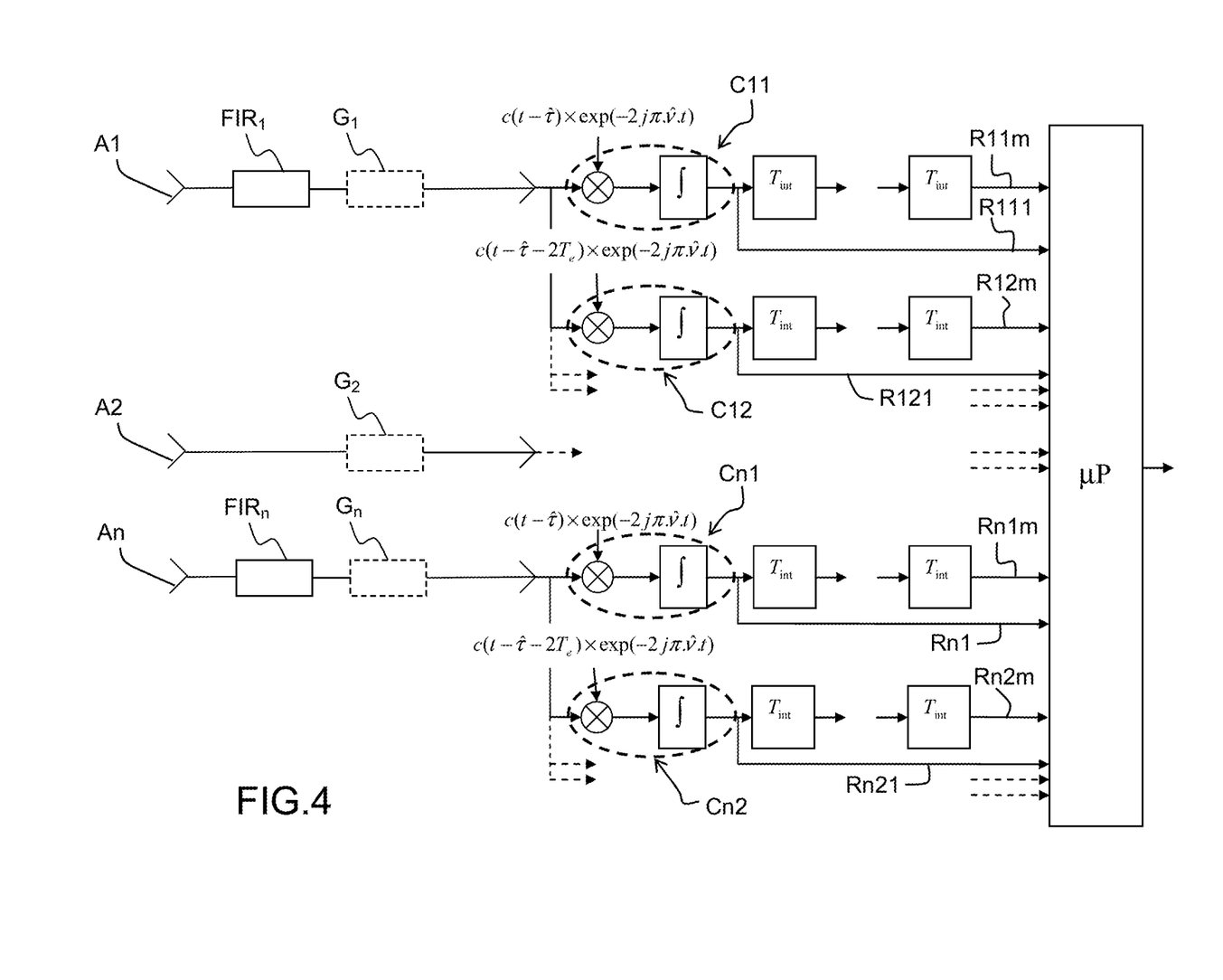
FIG. 4, a diagram of a multichannel GNSS receiver calibrated according to the invention.

An equalization filter is determined for each reception channel in order to be positioned behind each antenna and behind the RF reception chain as shown in FIG. 4.

An objective of the broadband equalization filter determined according to the invention is to equalize the phase, gain and group delay differences and fluctuations, in the useful signal band, between the various reception channels.

According to a first step 201, a correlation vector, each component of which is equal to a correlation point obtained as output from a correlator of a bank of correlators, is obtained for each reception channel. The correlation vector thus comprises the outputs of the correlators at one and the same instant in time. It is recalled that each correlator of the bank carries out a correlation with a local code which is delayed by a multiple of the sampling period.

The first step 201 is carried out for each reception channel by considering the signals received by the receiver for one or more satellites.

In an optional step 202, the correlation vectors are analysed in order to identify which signals are affected by multipaths arising from reflections of the signal transmitted by a satellite from obstacles, for example urban obstacles.

More specifically, if n signals transmitted by n different satellites are received by the receiver, the correlation vectors calculated for these n signals are analysed in order to determine whether any of these signals are affected by multipaths.

Various methods for identifying the presence of multipaths can be envisaged. In general, it is possible to compare the shape of the correlation function (determined on the basis of one or more correlation vectors) with a theoretical model. If the shape of the measured correlation function differs substantially from the theoretical model, this may mean that the signal is affected by multipaths.

At the end of step 202, the n received signals are classed into two groups, a first group of m signals (m being smaller than or equal to n) which are not affected by multipaths and a second group of n-m signals which are affected by multipaths. The signals of the second group are subsequently removed and are not taken into account for the following processing operations.

Step 202 is optional in so far as it is possible to implement the invention under the assumption that none of the received signals is affected by the presence of multipaths, for example because the environment of the receiver is not likely to cause reflections of the signal from obstacles.

The method then continues with two optional alternative steps 203, 204, an objective of which is to retain only one signal from among the m signals selected in step 202.

Step 203 consists of determining, for each of the m retained signals, the angle of elevation of the transmitting satellite, then of retaining solely the signal transmitted by the satellite having the highest elevation. The angle of elevation may be determined on the basis of the position of the satellite obtained using ephemeris.

Alternatively, step 204 consists of retaining the signal which has the highest signal-to-noise ratio from among the m signals. The signal-to-noise ratio may be estimated by various signal processing methods, for example on the basis of the method referred to as the "method of moments" or of the "narrow-to-wideband power ratio method" applied at the output of the prompt correlator. The document "Carrier-to-Noise Algorithms", M. Petovello, pp. 20-27, Inside GNSS January/February 2010 provides multiple exemplary algorithms for measuring the signal-to-noise ratio in a GNSS receiver.

If steps 202, 203, 204 are not executed, the simplest solution consists of randomly selecting one signal from among the n available signals.

In step 205, applied to the signal retained from among the n available signals, it is assessed, on the basis of the various correlation vectors determined in step 201, which reception channel has the longest group propagation delay, in other words the reception channel on which the received signal has the longest delay. For this purpose, the estimated delays on the various reception channels between the received signal and the locally generated code are compared. One way in which this delay is estimated consists of measuring, on each reception channel, the instant in time associated with the peak (or maximum) of the correlation function, then of comparing the various measurements in order to identify that which corresponds to the longest delay. The reception channel thus identified is subsequently referred to as the reference channel.

In a step 206, a broadband equalization filter is subsequently determined for each reception channel, aside from the reference channel.

A function of this filter is to compensate for the phase, gain and delay differences, in the useful signal band, between each reception channel and the reference channel which corresponds to the phase, gain and group propagation delay reference. Thus, in the receiver calibrated according to the invention such as described in FIG. 4, the reference channel (channel 2 in FIG. 4) does not comprise an equalization filter, while all of the other channels comprise an equalization filter positioned between the RF chain and the correlators.

The coefficients of the equalization filter are determined by carrying out an operation of deconvoluting the correlation vector of the reception channel in question by the correlation vector of the reference channel.

By applying the equalization filters thus determined upstream of the correlators, substantially identical correlation vectors are obtained, as output from the correlators, on each reception channel.

If the response of the equalization filter to be determined is denoted by $h(\ )$, the response of a bank of correlators by $C(\ )$ and the received signal taken at output of the RF chain by $S_r$, then the correlation vector $V_c$ obtained by applying the equalization filter between the RF chain and the bank of correlators is $V_c=C(h(S_r))=h(C(S_r))=h(V'_c)$, where $V'_c$ is the correlation vector obtained without applying the equalization filter. If $h(X)=X*V'c^{-1} V_{cref}$, where * denotes a convolution operation, then $V_c=V_{cref}$ is obtained on each equalized reception channel.

In one variant embodiment, the signals received on each channel may be filtered by an additional filter so as to increase the signal-to-noise ratio.

Figure 3:
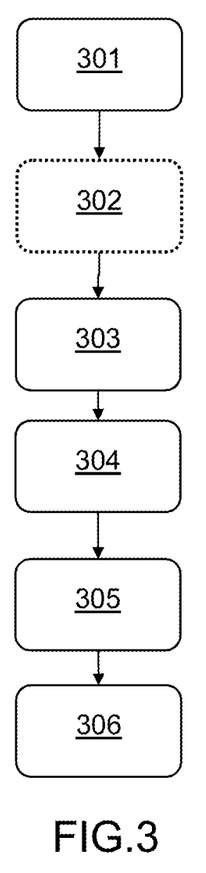
FIG. 3, a flowchart describing the steps for implementing a calibration method according to a second embodiment of the invention.

FIG. 3 shows a flowchart detailing the steps for implementing the calibration method according to a second embodiment of the invention which comprises the determination of a narrowband equalization filter for each reception channel.

The application of the broadband calibration method described above allows the mismatches between the channels to be equalized. The invention also proposes a narrowband calibration method which is applied in addition to the broadband calibration method and which allows the static phase and gain residuals between the various reception channels to be equalized.

The narrowband calibration method according to the invention is applicable to signals measured on a receiver which has been calibrated beforehand by the broadband calibration method according to the invention.

Thus, the method described with reference to FIG. 3 may be applied to correlation measurements taken from a receiver of the same type as that described in FIG. 1, but additionally comprising the equalization filters obtained by applying the broadband calibration method described in FIG. 2.

Alternatively, it is possible to employ the same correlation measurements used for the broadband calibration method, i.e. measurements taken from a receiver of the same type as that in FIG. 1, which does not comprise an equalization filter, then to simulate the effects of these equalization filters on the correlation measurements in order to generate new, "filtered" correlation measurements which may be used as input values for the narrowband calibration method.

The narrowband calibration method according to the invention comprises a first step 301 which is identical to the first step 201 of the broadband calibration method described in FIG. 2.

Stated otherwise, this step 301 consists of constructing a correlation vector, each component of which is equal to a correlation point obtained as output from a correlator of a bank of correlators, for each reception channel. The first step 301 is carried out for each reception channel while considering the signals received by the receiver for one or more satellites. As indicated, the correlation vectors are obtained by taking measurements from a receiver comprising broadband equalization filters or on the basis of correlation measurements taken from an uncalibrated receiver on which the effect of the broadband filters is simulated.

A step 302, identical to step 202 of the broadband calibration method, may then optionally be applied.

In this step 302, the correlation vectors are analysed in order to identify which signals are affected by multipaths arising from reflections of the signal transmitted by a satellite from obstacles, for example urban obstacles.

Various methods for identifying the presence of multipaths can be envisaged. In general, it is possible to compare the shape of the correlation function (determined on the basis of one or more correlation vectors) with a theoretical model. If the shape of the measured correlation function differs substantially from the theoretical model, this may mean that the signal is affected by multipaths.

At the end of step 302, those signals which are not affected by multipaths are retained. The number of those signals retained is denoted by Ns. This number is at least equal to two.

In a step 303, a spatial intercorrelation matrix $R_k$ of the receiver is constructed for each retained signal indexed by k.

The spatial intercorrelation matrix $R_k$ may be determined on the basis of the correlation vectors of the various reception channels. More specifically, each component of the intercorrelation matrix may correspond to the scalar product of two correlation vectors (or of a subset of the components of the correlation vectors) associated with two different reception channels.

In order to decrease the noise level affecting the values of the intercorrelation matrix and to obtain a full-rank matrix, the delay lines of the GNSS receiver, which are located behind the correlators (see FIG. 1), may be used in order to calculate multiple intercorrelation matrices at various successive instants in time, and then to calculate the mean of the determined intercorrelation matrices.

In a step 304, the theoretical direction of arrival of the signal, in other words the theoretical direction between the reference frame attached to the antenna array of the receiver and the satellite, is determined for each signal associated with a different transmitting satellite. This theoretical direction may be determined by an azimuth angle and elevation angle pair $(\hat{\theta}_k, \hat{\varphi}_k)$, or by any other pair of angles allowing a direction of arrival of the signal to be identified. The theoretical direction may be determined on the basis of the coordinates of the satellite which are obtained, for example, by virtue of ephemeris. Determining the theoretical direction of arrival of the signal also requires transposing the direction determined on the basis of the coordinates of the satellite, which are expressed in a fixed reference frame with respect to Earth, to a reference frame linked to the receiver and, more specifically, to the antenna array of the receiver. This change of reference frame requires an estimate of the attitude of the antenna array. The attitude may be expressed using three angles.

According to one variant embodiment of the invention, in the event that the attitude of the antenna array is not known, it is possible to take multiple a priori hypotheses on the value of the attitude and to integrate this data as a variable of the cost function determined in the following step 305. This point will be described in more detail below.

In a step 305, a cost function Q representative of the error between the estimated directions of arrival of the signals and the theoretical directions of arrival of the signals is determined.

The cost function Q may be determined as the sum of cost functions $Q_k$ associated with each signal arising from a satellite of index k.

A cost function $Q_k$ depends on the spatial intercorrelation matrix calculated in step 304 and, more specifically, on the inverse of this matrix. It also depends on the coefficients of the narrowband equalization filters determined in fine by the narrowband calibration method. These coefficients may be regrouped into a diagonal matrix $\Gamma$. A complex equalization coefficient is thus intended to be applied to each reception channel, preferably upstream of the correlators. The complex equalization coefficients, forming the narrowband equalization filter according to the invention, aim to correct the errors made in estimating the directions of arrival of the signals due to residual mismatch of the reception channels. Lastly, the cost function $Q_k$ depends on the steering vector $a(\hat{\theta}_k, \hat{\varphi}_k)$ of the antenna array of the GNSS receiver which comprises the amplitudes and the relative phase shifts of the signals received by each antenna of the array with respect to an antenna of the array used as reference, depending on the direction of the received signal.

The cost function $Q_k$ may take the following form: $Q_k = a(\hat{\theta}_k, \hat{\varphi}_k)^H \Gamma^H R_k^{-1} \Gamma \cdot a(\hat{\theta}_k, \hat{\varphi}_k)$, where the exponent H denotes the conjugate transpose operator. The overall cost function Q is given by the relationship $$Q = \sum_{k=1}^{Ns} a(\hat{\theta}_k, \hat{\varphi}_k)^H \Gamma^H R_k^{-1} \Gamma \cdot a(\hat{\theta}_k, \hat{\varphi}_k).$$

Any variant calculation of the cost function presented above falls within the scope of the invention insofar as this is indeed representative of the error between the estimated directions of arrival of the signals and the theoretical directions of arrival of the signals. The estimated directions of arrival of the signals are determined while taking into account a narrowband equalization filter applied to each reception channel and comprising a single complex coefficient, making it possible to compensate for the gain and the phase of the signal received on each channel so as to correct the estimated direction of arrival of the signal with respect to the theoretical direction determined on the basis of the known positions of the satellites.

The unknowns of the cost function Q which is determined at the end of step 305 are the narrowband equalization coefficients applied to each reception channel and formalized by the diagonal matrix $\Gamma$.

According to one variant embodiment of the invention presented above, if the attitude of the antenna array of the GNSS receiver is not known and it is not possible for it to be determined, then the steering vector $a(\hat{\theta}_k, \hat{\varphi}_k)$ may include the attitude of the antenna array as a parameter.

In a step 306, the values of the narrowband equalization coefficients, which allow the cost function Q determined at the end of step 305 to be minimized, are sought.

By rewriting the diagonal matrix $\Gamma$ in the form of a column vector $\kappa$, the cost function may be more advantageously formulated as:

$$Q = \kappa^H \left[ \sum_{k=1}^{Ns} \text{diag}(a(\hat{\theta}_k, \hat{\varphi}_k))^H R_k^{-1} \text{diag}(a(\hat{\theta}_k, \hat{\varphi}_k)) \right] \kappa = \kappa^H Z \kappa$$

The problem of minimizing the cost function Q therefore comes down to minimizing the term $\kappa^H Z \kappa$ under the constraint $\kappa_1 1$, where $\kappa_1$ denotes the first term of the vector $\kappa$. This constraint is necessary in order to avoid the trivial solution $\kappa=0$. By solving this quadratic optimization problem with linear constraint, the following solution is obtained:

$$\hat{\kappa} = \frac{Z^{-1} w}{w^H Z^{-1} w} \text{ with } w = [1 \ 0 \ \ldots \ 0]^T$$

$$Q_{min} = \frac{1}{w^H Z^{-1} w}$$

According to one variant embodiment of the invention presented above, if the attitude of the antenna array of the receiver is not known, it is added to the unknowns of the cost function and it is considered to be an additional parameter in the minimization of the cost function. For example, step 306 described above may be repeated for multiple hypotheses on the attitude of the antenna array taken from within a predetermined range of attitude variations. For each attitude hypothesis, the minimum $Q_{min}$ of the cost function is determined along with the equalization vector $\kappa$ which allows this minimum to be obtained. Next, an additional step of searching for the minimum among the minima $Q_{min}$ is carried out, retaining in fine the minimum $Q_{min}$ of the cost function from among the minima calculated for each attitude hypothesis and the associated equalization vector.

The calibration method according to the first or the second embodiment of the invention may be implemented as a computer program comprising instructions for its execution. The computer program according to the invention receives, as input, measurement points taken at the outputs of the correlators of a GNSS receiver such as described above. The computer program according to the invention delivers, as output, the coefficients of the broadband equalization filters and/or the narrowband equalization filters. The computer program may be recorded on a recording medium that can be read by a processor. The medium may be electronic, magnetic, optical or electromagnetic.

FIG. 4 shows a diagram of a multichannel GNSS receiver modified according to the invention.

The receiver described in FIG. 4 comprises the same elements as the receiver of FIG. 1. According to a first variant of the invention, it additionally comprises, on each reception channel but one, a broadband equalization filter $FIR_1, FIR_n$. In the example of FIG. 4, reception channel number two is the reference channel. The broadband equalization filters $FIR_1, FIR_n$ are determined by the broadband calibration method according to the invention such as described with reference to FIG. 2.

The broadband equalization filters $FIR_1, FIR_n$ are positioned, as indicated in FIG. 4, between the RF chains and the correlators of each reception channel.

The broadband equalization filters $FIR_1$, $FIR_n$ may be implemented by means of finite impulse response filters comprising a number of coefficients that is smaller than the number of correlators.

According to a second variant of the invention, the multichannel GNSS receiver additionally comprises not only the broadband equalization filters $FIR_1$, $FIR_n$ described above, but also a narrowband equalization filter $G_1$, $G_2$, $G_n$ on each reception channel (including the reference channel). The narrowband equalization filters $G_1$, $G_2$, $G_n$ may be determined by the narrowband calibration method according to the invention such as described with reference to FIG. 3.

The narrowband equalization filters $G_1$, $G_2$, $G_n$ may be positioned, as indicated in FIG. 4, between the broadband equalization filters and the correlators of each reception channel. Alternatively, they may also be positioned at the output of the correlator banks of each channel.

The narrowband equalization filters $G_1$, $G_2$, $G_n$ are implemented by means of a complex multiplier, i.e. it effects an amplitude gain and a phase shift on the signals received on each channel.

The various equalization filters and the various elements which make up the GNSS receiver according to the invention may be implemented by hardware and/or software means. In particular, the GNSS receiver as a whole or each element of the receiver may be implemented by a device comprising a processor and a memory. The processor may be a generic processor, a specific processor, an application-specific integrated circuit (ASIC) or a field-programmable gate array (FPGA).

The invention claimed is:

1. A computer-implemented method for calibrating a satellite navigation signal receiver having a plurality of reception channels each having a receiving antenna and a plurality of correlators for correlating a signal received by the antenna with a local code delayed by a parametrizable delay, said calibration method comprising:
    determining at least one broadband equalization filter by:
        measuring, for each reception channel, the correlation points obtained simultaneously as output from said correlators;
        constructing, for each reception channel, a correlation vector comprising the measured correlation points;
        determining, from the correlation vectors for each reception channel, a correlation function of the local code with the received signal;
        determining, from the correlation function, the reception channel, called the reference channel, for which the received signal has a longest delay with respect to the local code; and
        determining, for each reception channel other than the reference channel, the broadband equalization filter by calculating a deconvolution of the correlation vector of said reception channel by the correlation vector of the reference channel; and
    applying the broadband equalization filter between the receiving antenna and the correlators of each reception channel.

2. The method for calibrating a satellite navigation signal receiver according to claim 1, further comprising:
    before determining the at least one broadband equalization filter, searching for and retaining those signals, from among the signals received by said receiver and arising from multiple satellites, that are not affected by a presence of multipaths of the signal, and a selection of a signal from among those retained.

3. The method for calibrating a satellite navigation signal receiver according to claim 2, further comprising:
    searching for and selecting the signal, from among the retained signals, that is transmitted by a satellite having a highest elevation from among the satellites transmitting the signals received by said receiver.

4. The method for calibrating a satellite navigation signal receiver according to claim 2, further comprising:
    searching for and selecting the signal, from among the retained signals, that has a highest signal-to-noise ratio.

5. The method for calibrating a satellite navigation signal receiver according to claim 1, further comprising:
    filtering the outputs of said correlators in order to decrease a measurement noise.

6. The method for calibrating a satellite navigation signal receiver according to claim 1, further comprising:
    determining a narrowband equalization filter having a complex coefficient intended to be applied to the signal filtered by the broadband equalization filter on each reception channel by:
        filtering, for each received signal arising from a separate satellite and for each reception channel, the correlation vector using the broadband equalization filter;
        determining, for each received signal arising from the separate satellite, a spatial intercorrelation matrix $R_k$ from the correlation vectors of each reception channel;
        determining, for each received signal arising from the separate satellite, the theoretical direction of arrival of the received signal from a position of the satellite;
        determining estimated directions of arrival of the received signals from the spatial intercorrelation matrix $R_k$ and from the complex coefficient of the narrowband equalization filter applied to the received signal;
        determining a cost function Q representative of an overall error between the estimated directions of arrival and theoretical directions of arrival of the received signals, and
        searching for, for each reception channel, values of the complex coefficients that allow the cost function Q to be minimized.

7. The method for calibrating a satellite navigation signal receiver according to claim 6, wherein the spatial intercorrelation matrix $R_k$ is averaged over multiple consecutive instants in time.

8. The method for calibrating a satellite navigation signal receiver according to claim 6, wherein the directions of arrival of the received signals are transposed to a reference frame linked to the receiving antennas on the basis of an attitude of the receiver.

9. The method for calibrating a satellite navigation signal receiver according to claim 8, wherein the attitude of the receiver is integrated as a parameter of the cost function Q and the method additionally comprises a search for a value of the attitude of the receiver that allows the cost function Q to be minimized.

10. The method for calibrating a satellite navigation signal receiver according to claim 6, wherein the cost function Q depends on the steering vectors $a(\hat{\theta}_k, \hat{\varphi}_k)$ of the receiving antennas of the receiver which are calculated along the theoretical directions of arrival of the received signals.

11. The method for calibrating a satellite navigation signal receiver according to claim 6, wherein the cost function Q is obtained by summing multiple cost functions, each representative of an error between the estimated direction of arrival and the theoretical direction of arrival of a received signal arising from the separate satellite.

12. The method for calibrating a satellite navigation signal receiver according to claim 6, wherein the cost function Q is given by the relationship $$Q = \sum_{k=1}^{Ns} a(\hat{\theta}_k, \hat{\varphi}_k)^H \Gamma^H R_k^{-1} \Gamma \cdot a(\hat{\theta}_k, \hat{\varphi}_k),$$

where NS is the number of received signals arising from separate satellites, $R_k^{-1}$ is the inverse of the spatial intercorrelation matrix, $\Gamma$ is a diagonal matrix, the components of which are the complex coefficients of the narrowband equalization filters on each reception channel, and $^H$ is the conjugate transpose operator.

13. A computer-implemented method for calibrating a satellite navigation signal receiver having a plurality of reception channels each having a receiving antenna, a plurality of correlators for correlating a signal received by the antenna with a local code delayed by a parametrizable delay, and the at least one broadband equalization filter determined by execution of the calibration method according to claim 1 and applied between the receiving antenna and the correlators of each reception channel, said calibration method comprising:
  determining a narrowband equalization filter having a complex coefficient by:
    determining, for each received signal arising from a separate satellite, a spatial intercorrelation matrix $R_k$ from the correlation vectors of each reception channel;
    determining, for each received signal arising from the separate satellite, the theoretical direction of arrival of the received signal from a position of the satellite;
    determining estimated directions of arrival of the received signals from the spatial intercorrelation matrix $R_k$ and from the complex coefficient of the narrowband equalization filter applied to the received signal;
    determining a cost function Q representative of an overall error between the estimated directions of arrival and the theoretical directions of arrival of the received signals; and
    determining, for each reception channel, values of the complex coefficients that allow the cost function Q to be minimized; and
  applying the narrowband equalization filter to the signal filtered by the broadband equalization filter on each reception channel.

14. A satellite navigation signal receiver, comprising:
  a plurality of reception channels, each comprising:
    a receiving antenna,
    a plurality of correlators for correlating a signal received by the antenna with a local code delayed by a parametrizable delay, and
    the at least one broadband equalization filter positioned between the receiving antenna and said correlators and determined by execution of the calibration method according to claim 1.

15. A satellite navigation signal receiver, comprising:
  a plurality of reception channels, each comprising:
    a receiving antenna,
    a plurality of correlators for correlating a signal received by the antenna with a local code delayed by a parametrizable delay, and
    the at least one broadband equalization filter positioned between the receiving antenna and said correlators and determined by execution of the calibration method according to claim 1; and
    on each reception channel, the narrowband equalization filter with a complex coefficient positioned between an output of the broadband equalization filter and an input of said correlators and determined by execution of the calibration method according to claim 6.

16. The satellite navigation signal receiver according to claim 14, further comprising:
  on each reception channel, at least one delay line connected to the output of said correlators.

17. A computer program comprising instructions stored on a tangible non-transitory storage medium for executing on a processor the method for calibrating a satellite navigation signal receiver according to claim 1, when the program is executed by a processor.

* * * * *